Nov. 28, 1944.   J. E. L. RYAN   2,364,029
METHOD AND APPARATUS FOR MANUFACTURE OF HOLLOW RUBBER ARTICLES
Filed Oct. 23, 1941   4 Sheets-Sheet 1
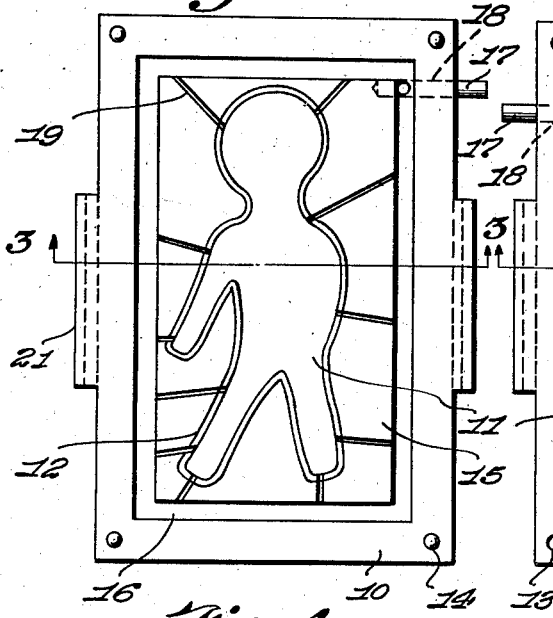
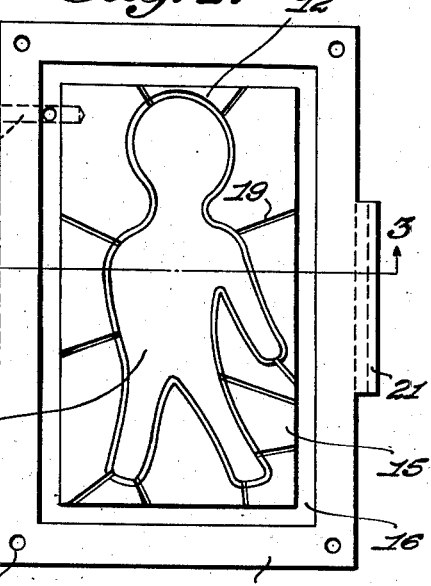
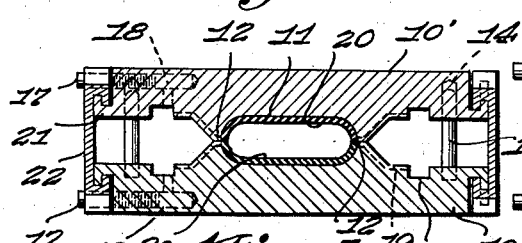
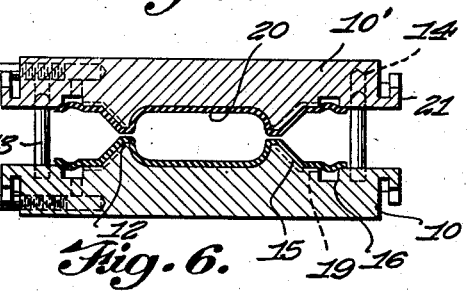
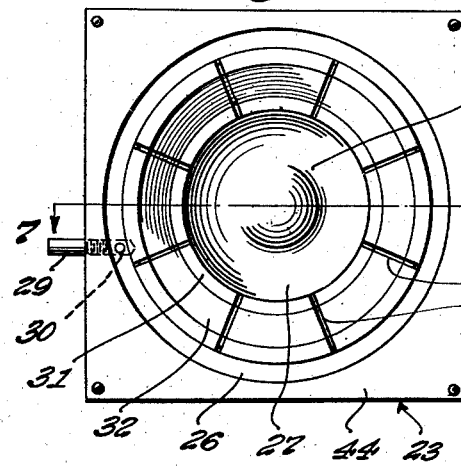
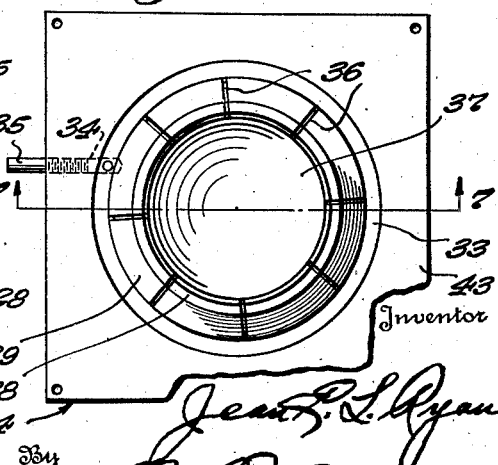
Inventor
Jean E. L. Ryan
By
Attorney

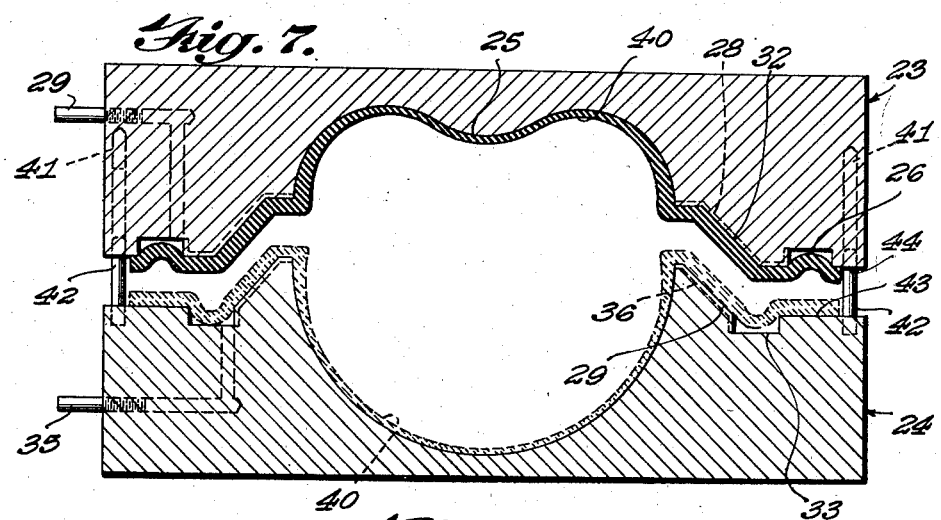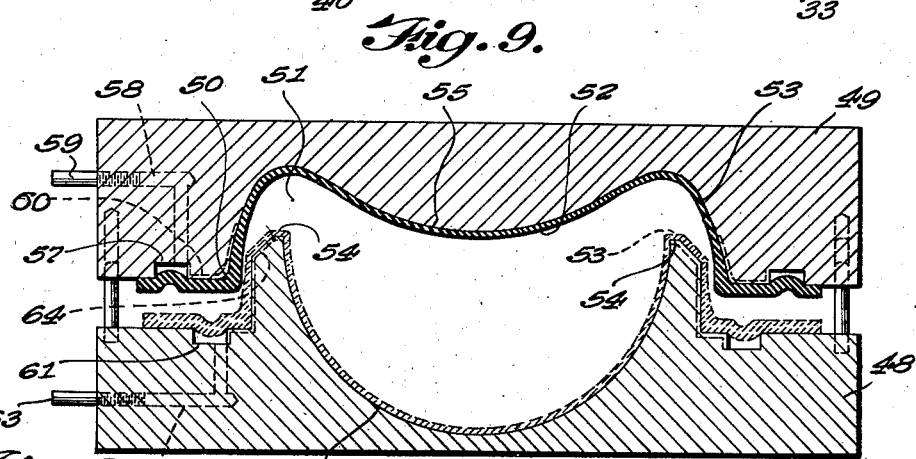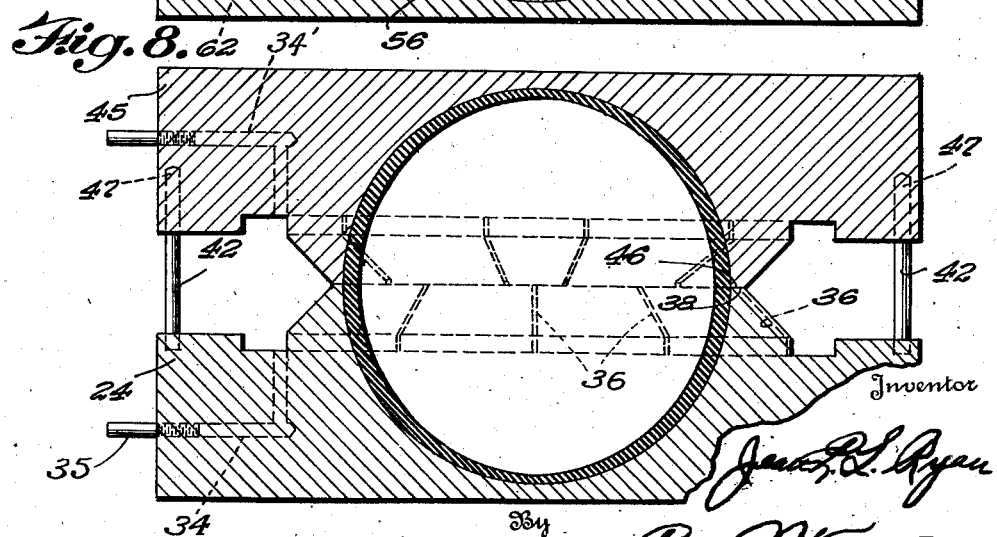

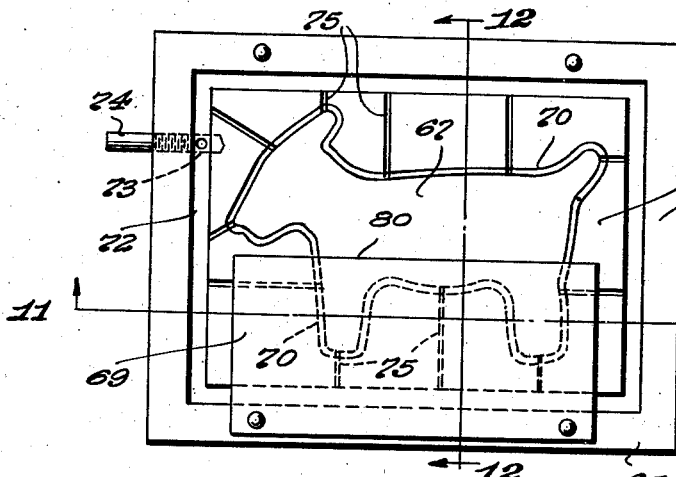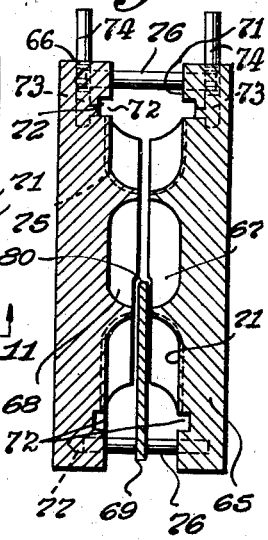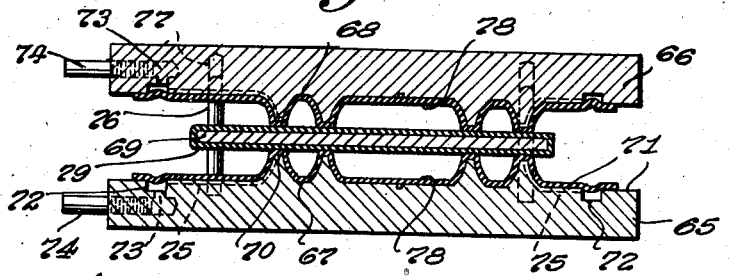

Nov. 28, 1944. J. E. L. RYAN 2,364,029
METHOD AND APPARATUS FOR MANUFACTURE OF HOLLOW RUBBER ARTICLES
Filed Oct. 23, 1941 4 Sheets-Sheet 4
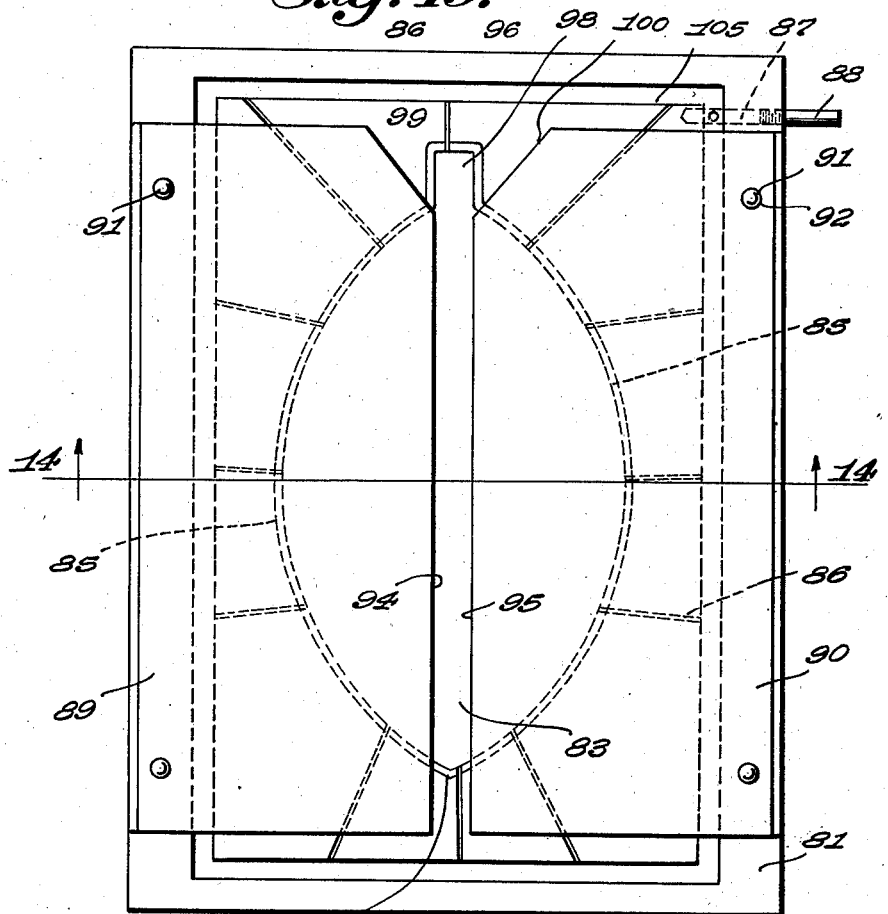
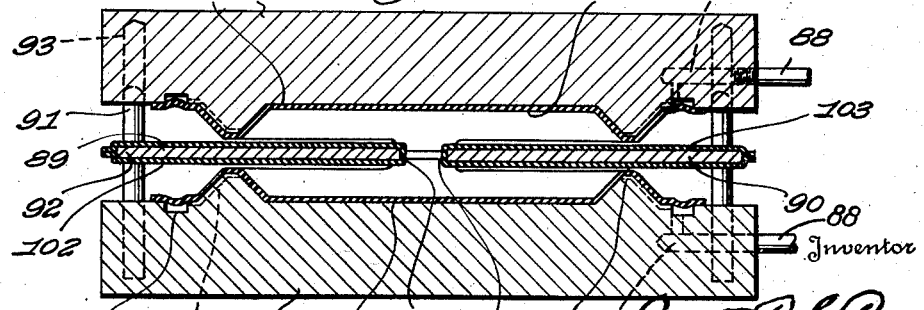

Patented Nov. 28, 1944

2,364,029

UNITED STATES PATENT OFFICE 2,364,029

METHOD AND APPARATUS FOR MANUFACTURE OF HOLLOW RUBBER ARTICLES

Jean E. L. Ryan, Larchmont, N. Y.

Application October 23, 1941, Serial No. 416,252

18 Claims. (Cl. 18—35)

The present invention relates in general to the molding of plastics and in particular to method and apparatus for the manufacture of hollow articles from sheet stock such as raw, sheet-rubber stock.

The main and general object of the invention is the attainment of certain improvements in the art of molding plastics whereby to obtain more perfect articles, especially hollow rubber articles, having irregular or decorative molded surfaces such as animal forms, dolls, balls and various inflatable objects, and hollow rubber balls in which uniformity of wall thickness is an important desideratum; the elimination of waste of material through spoilage of articles; and a general simplification of both process and apparatus.

Important among the more specific objects are: to eliminate the necessity for a separate or preliminary forming mold; to effect a pneumatic seating, forming and cutting of a hollow, raw-rubber article directly in a vulcanizing mold without the use of the usual vents or exhaust holes in the deeper parts of the mold cavity, whereby to avoid a tendency to a blowing of the rubber through such holes while it is soft and being vulcanized, and to avoid interruption of continuity of the surface or surface decoration of the article; to effect a seating of flat, sheet, plastic material into deep mold forms with substantial uniformity of stretch throughout the walls of the formed article including the portion at and near the seams; to improve the method and means for transferring a formed portion of an article from a forming or stretching mold to a curving mold whereby to expedite such transfer and avoid a tendency to pinching of the surface; and to accomplish the production of thin walled, blown toys and the like in the form of four legged animals, or thin walled spherical or deep cupped articles having gores or panel sections such as panelled balls or bathing caps, with good strong seams and in one cutting operation.

The usual practice in the manufacture of hollow, rubber articles from raw sheet-rubber stock is to lay the sheet of raw rubber over the cavity of a forming mold approximately the size and shape of the finished article, and force the rubber stock into and against the walls of the mold cavity by pneumatic pressure as by the application of a vacuum to the mold cavity beneath the rubber stock through a duct communicating with the cavity through an opening or openings in the deeper portions of the mold cavity. After the two halves of the articles are thus shaped in their respective parts of the forming mold, the mold parts are brought together under pressure to assemble the two halves of the article thus formed and shear off the surplus material from around the edges of the seam between the halves, the mold parts being provided with cutting edges around the cavities for this purpose.

The article thus formed and in the raw state is then removed from the forming mold and placed in a curing or vulcanizing mold, a suitable heat expanding chemical as ammonia powder or water having been placed within the article in the preliminary forming thereof, where a superatmospheric vulcanizing pressure is desired. The vulcanizing mold is then clamped together about the article and heated in the usual manner to effect vulcanization.

Objections to this procedure have been the necessity of having to form the raw biscuit in one mold and transfer it in the raw state to another mold, even for simple relatively flat articles where even stretching of the sheet material is not required; and that in making the transfer from mold to mold it is not possible, even for unusually skilled workers, always to place the raw biscuit accurately in the vulcanizing mold, and that inaccurate placements result in a large amount of wasteful scrap by producing articles having thin walls in some spots and in other places wrinkles or folds commonly called pinches, caused by the raw rubber folding upon itself and sticking together. A further disadvantage of uneven contact between the raw rubber and the mold caused by inaccurate fitting of the raw biscuit in the curing mold is that the heat required to generate the gas from the expansible substance, for producing the vulcanizing pressure, must first heat and consequently soften the rubber so that those portions lying against the mold will soften before any portions which do not fit so close, and as the article inflates the stretch of the rubber will be greater at such softer parts, resulting in an uneven wall.

If the raw sheet-stock could be pneumatically seated and formed directly in a vulcanizing mold of the size and shape of the finished article and not removed before vulcanization, there would be no pinches or unevenness of contact between the article and the mold, but this has been deemed impracticable with known methods and apparatus probably because of the generally accepted belief that it was necessary to provide venting opening of ample size at low points in the mold cavity, into which the softened, heated rubber would tend to flow if vulcanization were attempted in the same mold, with resultant blowing through of thin walled portions and at least a marring of the surface of the finished article at the venting openings.

My improved method and apparatus make it possible to pneumatically seat the thin, raw sheet-stock directly in and evenly against the walls of the cavity of a mold of the true shape and size of the finished article and in which the parts of the article may be brought together, seamed, trimmed at the seams and vulcanized, thus avoiding the hazards of transfer in the raw state and the incident extra labor, and necessity for special skill.

The method and means whereby this and other important objects of the invention are attained will be clearly understood upon perusal of the following specification and the drawings accompanying the same.

In the drawings:

Figure 1 is a face view of a lower mold portion for molding a toy figure of less depth than breadth.

Figure 2 is a similar view of a complementary upper portion of the same mold.

Figure 3 is a section on the line 3—3 of Figures 1 and 2 showing both mold portions with the rubber stock seated therein, and brought into opposition ready for closing.

Figure 4 is a section similar to Figure 3 but showing the mold portions closed together to cut the marginal excess of rubber and enclose the article for curing.

Figure 5 is a face view of a forming mold member or portion of a mold for forming the wall of a portion of a hollow sphere.

Figure 6 is a similar view of a portion of a mold for vulcanizing the article formed in the mold of Figure 5.

Figure 7 is a section on the line 7—7 of Figures 5 and 6 on a large scale, showing the two mold portions brought together for transfer of a preformed portion of the article.

Figure 8 is a sectional view similar to Figure 7 but showing both the upper and lower halves of a curing mold brought together with the rubber seated therein for curing.

Figure 9 is a sectional view similar to Figure 7 but showing complementary portions of a modified form of forming and curing molds.

Figure 10 is a face view of one half of a mold for a thin rubber, blown toy in the form of a four legged animal.

Figure 11 is a section on line 11—11 of Figure 10 showing the two halves of the mold brought into opposition with the rubber seated therein before the halves are clamped together.

Figure 12 is a section on the line 12—12 of Figure 10 showing two mold portions brought together in partially closed position and with the rubber omitted.

Figure 13 is a face view of one half of a mold for forming a blown rubber ball.

Figure 14 is a section on the line 14—14 of Figure 13 showing two such mold halves brought into opposition with the rubber seated therein before the halves are clamped together.

Figures 15 to 18 are fragmentary detailed views showing the cross-sectional contours of different forms of cutting edges.

Figures 19 and 20 are fragmentary detailed views showing the cross-sectional contours of different forms of the capillary venting channels.

Referring to the drawings in detail and first to Figs. 1 to 4, here is shown, by way of example a simple two piece mold for making a hollow rubber doll. It comprises the two complementary mold members 10 and 10' consisting of a mold block having formed therein a mold cavity 11 shaped to form half of the article. In each mold part of the cavity is entirely surrounded at its rim by a raised beveled rib forming a blunt cutting edge 12 adapted to register with and meet the similarly shaped cutting edge on the other mold member when the two members are brought together, the mold members being guided into registering engagement by suitable dowel pins 13 fixed in the lower mold member 10 and arranged to engage guide holes 14 in the upper member 10'. Clearance around the outside of the cutting edge is provided by a clearance slope 15 extending outwardly and rearwardly from the edge to the rearwardly offset, marginal portion of the mold member.

To effect a holding of the sheet of raw rubber over the face of the mold member in the operation of seating the material in the mold cavity, a known form of pneumatic holding means is provided which consists of a continuous groove 16 in the face of the mold block extending entirely around the cavity, and which groove is arranged to be connected with a suitable source of vacuum through the connecting pipe 17 and a duct 18 in the mold block. To enable the raw sheet material to be pneumatically closely seated in the mold cavity and cut and vulcanized without removal therefrom, I depart from the usual practice of exhausting the cavity through openings in its deep portions and instead provide a plurality of relatively small or fine open-trough venting channels or grooves 19 extending from the cavity at the rim of the cavity across the cutting edge and the face of the mold block into communication with the holding groove 16. The holding groove thus functions as an exhaust manifold for the numerous venting channels 19.

It will, of course, be understood that the seating of the sheet rubber stock in the mold cavity may be effected without the use of a vacuum, by applying a super-atmospheric air-pressure to the outer face of the sheet of rubber to force it into the mold cavity, the air within the cavity exhausting out through the venting grooves 19, the manifold groove 16 and the duct 18 and pipe 17 against atmospheric pressure. In the latter case a suitable air box or hood may be used to confine air under pressure over the outer surface of the sheet of rubber being seated in the mold. Also the application of pressure on the outside of the sheet and a vacuum in the mold cavity may be used both at the same time.

While the venting grooves 19 are here shown as of a substantial cross-sectional area for the sake of a clear showing, it is to be understood that the actual size need not be greater than one millimeter in width and depth and preferably much smaller than this. It is possible to use vents of a width of one one-hundredth of an inch. For best results, in the case of a doll or toy animal, the vents should be situated especially at the ends of projecting portions of the article such as feet, hands, head, tail and ears as well as at various other points around the margin of the mold cavity. In the case of cavities with round or oval margins, the vents may be spaced around the margin approximately one inch apart. The number and spacing of the vents will of course vary with the character of the article, the size of the venting grooves and the thickness of the raw sheet material. Because of their simplicity of form, the venting grooves may be made practically as numerous as desired without substantial further expense or complication of structure especially where the grooves are extremely fine consisting simply of a deep narrow scoring of a width in the neighborhood of one one-hundredth of an inch.

As is indicated in dotted lines in Figure 3, the venting grooves 19 lie in the faces of the mold members and extend from the side walls of the mold cavity at the margin, across the cutting edge 12 and down the clearance slope 15 to the holding groove 16 which latter acts as a common or manifold connection for all the venting grooves.

Figure 3 also shows how the sheet of raw rubber stock 20 when laid across the face of a mold section into the cavity and over the holding groove 16, and vacuum applied through the pipe 17 and duct 18 to the holding grooves 16, the outer marginal portion of the sheet of raw stock 20 becomes firmly held against the marginal, offset face of the mold member at the holding groove 16, while the central portion of the sheet becomes thoroughly and evenly seated in the mold cavity. Because the cutting edge is relatively blunt and not sharp enough to bite into the rubber stock under force of the pneumatic seating, the exhaust grooves remain open under the rubber, and this is true whether the pneumatic seating is effected by the application of vacuum below the sheet of stock, the application of super-atmospheric pressure above the sheet or both. The sheet rubber stock thus snugly and evenly seated in the mold cavity assumes the exact shape of the cavity in the cold state and before the mold is heated so that there will be no further stretching of the walls of the article during vulcanization and consequently no tendency to thin out and blow through at points, resulting in spoilage of the vulcanized article and wastage of the material thereof. Any imperfection that might occur in the article caused by a stretching and breaking through would occur while the article is being seated and formed in the cavity in the raw state and would immediately become apparent to the operator by a breaking of the vacuum or other undue variation in pressure in the air system used for the pneumatic seating, with the advantage that the operation may be interrupted before proceeding to the vulcanization, and the raw material recovered.

After the seating of the raw stock 20 in both the upper and lower mold portions 10 and 11, and preferably while maintaining the application of a vacuum through the vacuum pipes 17, the two mold parts are brought into superposition as indicated in Figure 3 with the dowels 13 in telescopic engagement with the guide holes 14. The mold members are then drawn together and clamped in the closed position shown in Figure 4 by suitable clamping means such as the known arrangement of pairs of inclined ribs 21 carried by the mold members and having inclined surfaces arranged to be engaged by a U-shaped clamp 22 driven thereover with a wedging action to forcibly draw and clamp the mold members together. The mold members thus brought together under pressure with the mold parts clamped together in this position and the vacuum connection removed from the pipes 17 and the latter left open to atmosphere, the mold is heated in any known or other suitable manner to vulcanize the article thus formed therein, a suitable pressure generating substance such as ammonia having been placed within the hollow of the article according to usual practice if desired.

Because of the extremely small area of cross-section of the vents the frictional resistance to the flow of rubber thereinto is so increased that any possibility of the rubber blowing through the vents is substantially eliminated. The small fluid conducting capacity of the vents is offset by the use of a large number of such vents.

A marked advantage of the open-trough venting channel is that it is open to ready inspection throughout its length and may be readily cleaned with brush or chemicals regardless of its fineness. Another advantage is that by staggering the positions of the channels in the different mold parts, especially where they cross the cutting edge, the cutting edge of one mold part may be provided with complemental projections adapted to extend into the venting channels of the other section where the channels cross the cutting edge to mechanically block off the channels when the mold members are clamped together. Such complemental projections would be particularly advantageous in the use of raw material of relatively low viscosity.

A modification of the invention adapting it to the manufacture of spherical or deeply bulged hollow articles having a depth of about half or more than half the width of the article, such as balls, atomizer bulbs and the like, is here exemplified by a disclosure of such modification applied to the manufacture of a hollow rubber ball, apparatus for which is illustrated in Figures 5 to 8.

Here Figures 5 and 6 are face views of a preforming mold member 23 and a vulcanizing mold member 24, respectively, while Figure 7 is a section on an enlarged scale showing the two mold members 23 and 24 brought together face to face for pneumatic transfer of a preliminarily stretched and formed portion of the article from the mold member 23 to the mold member 24.

To effect the required snug seating of the raw stock under force of pneumatic pressure, the mold 23, for example, like the mold members previously described is provided with a holding groove 26 formed in the face of the mold block around and outside the cavity 27 and acting also as a venting manifold with which to connect the multiplicity of venting grooves 28, connection with the holding groove from outside the mold being provided for by the outside connecting pipe 29 and channel 30 extending the connection from the pipe to the holding groove. The venting grooves 28 communicate with the cavity near the rim and extend from the cavity across the cutting edge 31 and along the sloping marginal portion 32 to the holding groove. Similarly the vulcanizing mold 24 is provided with a holding groove 33 in communication through a channel 34 with an outside connecting pipe 35, the holding groove acting as a venting manifold for the multiplicity of fine venting grooves 36 extending from communication with the cavity 37 near the rim, across the cutting edge 38 and along the sloping clearance surface 39 to the holding groove.

In the manufacture of articles of high convexity from sheet, raw stock of uniform thickness, any attempt to pneumatically seat the stock directly in a mold cavity of the required depth, results in a stretching of the stock increasing in degree toward the deepest portion of the cavity, leaving it thicker at and near the edges of the cavity and thus producing uneven thickness in the walls of the finished article. It is the purpose of the preforming mold to avoid this effect by the provision of a re-entrant portion 25, the purpose of which is to support the central portion of the sheet of raw stock against deep displacement during pneumatic seating of the stock in the mold cavity whereby the stretching force is applied in somewhat greater proportion in a region between the center and the rim of the mold with the result that the wall of the hemispherical portion of the article thus formed is stretched to substantial uniform thickness from the center of the cavity to near the rim. The cavity 37 of the vulcanizing mold portion 24 is, of course, of the shape and size of the finished article and in order that the portion of the article thus formed in the preforming mold will be capable of assuming the shape of the cavity of the vulcanizing mold without substantial stretching or flow of the raw material, the re-entrant portion 25 is formed with a superficial area equivalent to that of the corresponding surface of the cavity of the vulcanizing mold.

The solution of the problem of obtaining a substantially uniform stretching of the raw sheet material from the center to near the rim of the mold, through the use of a re-entrant portion, is already known and well understood in the art, being disclosed in the patent to F. J. Roberts No. 1,219,351 of March 31, 1917, and subsequent patents to the same inventor. Heretofore it has been the practice to bring together two such portions of a preforming mold with the raw material seated therein, to bring the two halves of the article together with a given quantity of a suitable expansion material such as ammonia powder or water contained in the hollow of the article, bringing the mold parts together under suitable pressure to seam the two halves of the article together and shear off the outside marginal portion between the cutting edges of the mold portions. The mold portions were then separated and the article removed and transferred to a vulcanizing mold having a cavity of the desired shape of the finished article.

The present invention improves upon such prior art practice by the provision of a method and means for effecting a pneumatic transfer of an article portion from a preforming mold member directly to a corresponding portion of a combined cutting and vulcanizing mold with increased facility and speed and with assurance of accurate seating and avoidance of pinches.

According to the present invention, the sheet of raw rubber 40 is first seated in a preforming mold member 23 as indicated in solid lines in Figure 7. This is accomplished by laying the sheet across the face of the mold member 23 and applying a vacuum to the connecting pipe 29 whereupon the suction created in the holding groove 26 holds the marginal portion of the sheet tight against the face of the mold while the vacuum connection extended from the holding groove along the multiplicity of venting grooves 26 to the sides of the mold cavity exhausts the air from between the wall of the cavity and the rubber sheet causing the latter to be drawn tightly into and against the walls of the cavity effecting a substantially even stretching of the sheet into the cavity with resulting uniform thickness from the center of the cavity to near the rim. It will, of course, be understood that during such seating of the stock, the mold member is preferably positioned with the cavity facing upwardly. With this portion of the article thus formed in the forming mold portion 23, the latter preferably with the vacuum still applied, is inverted over the upwardly facing, curing mold member 24, as shown in Figure 7, to bring the guide holes 41 in the mold member 23 into telescopic relation with the dowels 42 in the mold member 24. Guided by the holes and dowels, the mold members are next brought together to bring the marginal portion of the rubber sheet into contact with the marginal face portion of the curing mold member 24 which latter face portion, including the sloping portion 39 and the flat portion 43 are shaped complementary to the face portions 32 and 44 of the forming mold to insure uniform contact of the margin of the sheet 40 with the two mold surfaces. The vacuum connection with connecting pipe 29 of the forming mold is then replaced by a connection to atmosphere and vacuum applied to the connecting pipe 35 of mold member 24. This effects an immediate and direct transfer of the formed sheet 40 from the solid line position in mold member 23 to the dotted line position in mold member 24 with what was before a re-entrant or dented-in portion of the formed sheet, now bulged out into close fitting contact with the deep central portion of the curing mold cavity of equivalent area. To insure effective contact of a continuous marginal portion of the rubber sheet 40 with the edges of the holding groove 33 of the mold member 24, this groove is radially offset from the holding groove 26 of the mold member 23 so as to engage with a flat portion of the sheet free from that portion distorted by the groove 26. The vacuum acting on this continuous, surrounding, marginal portion of the sheet, draws such portion partially into the groove against the edges of the groove to effectively clamp the sheet against the face of the mold and seal the inner portion from the atmosphere after which the vacuum acting through the multiplicity of venting grooves 36 acts to evenly seat the bulged portion of the sheet in the mold cavity. The effective clamping operation of the holding groove thus makes it unnecessary to clamp the mold members 23 and 24 together.

While the pneumatic transfer is here described as taking place through the use of only a vacuum, it will be obvious that in addition to the use of a vacuum in the curing mold cavity, a suitable source of compressed air may be connected with the venting system of the preforming mold member, or that the compressed air connection with the forming mold may be used alone, and the mold member 24 simply vented to atmosphere, it being understood, of course, that in the latter case some known or other suitable form of holding frame would be used to take the place of the vacuum, holding groove in the curing mold.

After transfer of the article portion 40 to the curing mold the forming mold member 23 is removed and a second curing mold member, complementary to the member 24, and in which has been seated the remaining portion of the article in a manner similar in all respects to that above described, is placed in inverted position above the mold member 24 and the two brought together as indicated in Figure 8, under pressure to join the two article portions at the peripheral edges of the mold cavities and bring together the opposed registering cutting edges to shear off the surplus stock. In Figure 8 it will be seen that the second curing mold member 45 is complementary to the member 24 with a peripheral cutting edge 46 opposed to and registering with the cutting edge 38 of the mold member 24, and is provided with guide holes 47 cooperating with the dowels 42 to guide the mold members together in proper register. Any known or other suitable clamping means, not shown, may be provided for holding the mold members 24—25 together in the position shown. The mold so held in closed position is then heated to effect a vulcanization of the rubber article formed therein, a suitable expansion material such as ammonia powder or water for generating the desired vulcanizing pressure having been placed within the hollow of the article before bringing the mold members together. A marked advantage of the above described application of the invention in the making of even walled articles such as hollow balls, is that the raw rubber may be drawn directly into the curing cavity without the use of the usual vacuum holes in the cavity through which the rubber might blow while it is hot and being vulcanized.

To achieve the further object of obtaining substantial uniformity of stretch throughout the walls of a formed article of high convexity, I provide in combination with a vulcanizing mold member, a novel preforming mold member as illustrated in Figure 9. In this combination, the vulcanizing mold member 48 is the same as that of Figures 6, 7 and 8, while the prestretching or preforming mold member 49 departs widely from the usual cooperative relation of a preforming mold member to its complementary curing mold member, in that the rim 50 of its cavity 51 extends laterally outwardly beyond the rim of the cavity of the curing mold member when the two members are brought together as shown. The effect of this is that when a sheet 52 of raw rubber is stretched and seated in the preforming cavity as indicated in solid lines, the marginal part 53 of the sheet lying within the stretched portion, will overlie the cutting edge 54 of the curing mold member 48 and thus become that portion of the wall which will lie at and near the rim of the curing mold when the sheet 52 is transferred from the preforming mold member to the curing mold member as indicated in dotted lines. The sheet having been evenly stretched in the preforming mold from the center to and slightly beyond the marginal part 53, due to the known effect of the re-entrant portion 55, the portion of the sheet seated within the curing cavity 56 will be of substantially even thickness throughout, including the marginal portion at and near the very rim of the cavity.

The seating of the sheet in the preforming mold member and the transfer of the preformed sheet from the preforming mold member to the curing mold member is accomplished pneumatically in a manner the same as that described in connection with Figures 5 to 8. To this end, the forming mold member 49 is provided with a holding groove 57 in communication through a channel 58 with an outside connection pipe 59, and acting as a venting manifold for a multiplicity of fine venting grooves 60 extending from the rim of the cavity along the face of the mold member to the holding groove, while the curing mold 48 is similarly provided with the holding channel 61 in communication through an interior channel 62 with an outside connecting pipe 63 and serving as a manifold connection for a multiplicity of narrow venting grooves 64 extending from the interior of the cavity near the rim, across the cutting edge 54 and the face of the mold member to the holding groove. After the sheet is seated in the curing mold member 48, the preforming mold member 49 is removed and a second curing mold member complementary to the member 48 and containing a remaining preformed portion of the article seated therein, is placed in inverted position above the member 48 and the two brought together, in a manner similar in all respects to that previously described in connection with Figure 8, and heated to effect vulcanization of the article. Thus there is formed a relatively, thin walled, hollow article in which the walls are of a high degree of uniformity of thickness throughout, including the portion at the seam, a quality which insures that any expansion of the article after withdrawal from the curing mold due to internal pressure will be uniform. This feature is also of importance in the manufacture of game balls which should be not only superficially spherical but should have their weight evenly distributed about the center of the ball.

In the application of the invention to the manufacture of a blown toy of very thin rubber in the form of a four legged animal, a three part mold is provided as indicated in Figures 10 to 12. This assemblage comprises in general the two outside mold portions 65 and 66 with cavities 67 and 68 respectively, for forming the outer sides of the article, and an intermediate mold portion, in the form of a plate 69, for forming a gore between certain parts of the outer sides of the article. As the two outside mold portions are substantially the same in structure except that one is in the nature of a mirrored image of the other, a detailed description of one, for example the member 65, will suffice for both. Here the cavity 67 in the form of one side of the animal including the outer halves of the right legs is provided at its rim with a cutting edge 70 raised above the face 71 of the mold member and extending around the entire rim. A pneumatic holding groove 72 formed in the face of the mold member surrounds the cavity and communicates through an internal channel 73 with a connecting pipe 74. A multiplicity of open-trough venting channels or grooves 75 extend from communication with the cavity at the rim of the cavity across the cutting edge 70 and along the face of the mold member in the holding groove 72. The intermediate mold portion 69 consists simply of a flat plate of less area than the outside portions and arranged to be placed between the latter and to extend only between a portion of the complementary mold cavities, said portion comprising the legs and a small portion of the lower part of the body as is clearly shown in Figures 10 and 12. Inasmuch as the intermediate member 69 is a simple, flat plate element without cavities and with a smooth, flat surface, it is not necessary to provide it with venting grooves to insure even contact. However, venting grooves may be used if desired and to special advantage where the desired form of the article requires that the surface of the intermediate member contain a cavity or other variation from a flat plane. Suitable dowels 76 and guide holes 77 are provided, cooperating in the usual manner, to guide the mold parts together when superimposed. As is indicated in Figure 12, the cutting edges 70 of the opposed outside mold portions 65 and 66 are extended outwardly in different amount at different portions so as to coact with the plate where overlapped thereby and with each other where not overlapped by the plate.

In the use of this mold, thin sheets 78 of raw rubber are pneumatically seated directly in the two outside mold portions 65 and 66 in a manner as previously described for the foregoing modification, and a thin sheet 79 of thin rubber wrapped around and across both sides of the plate 69, care being taken especially to extend the sheet 79 around the inner edge 80 of the plate, after which the three mold portions are brought together as indicated in Figures 11 and 12, a showing of the rubber being omitted from Figure 12 for the sake of clearness in the showing of the relation of the cutting edges to each other and to the plate. Further movement of the members together under pressure brings the opposed cutting edges directly into coaction with each other or with the plate, as the case may be, to shear off the surplus stock at the cutting edges and join the sheets together at the inner sides of the cutting edges. At some convenient point as at the tip of the tail the mold is arranged with a tube forming portion 104 for forming a short tubular extension into which a suitable inflating valve or nipple may be placed. With the raw stock thus seated in the mold, the latter, held together by any known or other suitable clamping means not shown, is then heated to effect vulcanization of the rubber article therein. Where desired a small quantity of a suitable expansible material such as ammonia powder or water may be placed within the hollow of the article before closing the mold parts to generate a vulcanizing pressure and insure continued close seating of the rubber during curing. From the above it will be seen that the present invention provided for the making of a thin walled inflatable toy in the form of a four legged animal, or other three dimensional object requiring the use of more than two sections of sheet rubber, in which the forming, cutting and curing are accomplished in a single mold assemblage.

This phase of the invention lends itself to objects of various shapes, and especially well to thin walled spherical or deep-cupped articles. For example, Figures 13 and 14 show a four part mold involving the principles of construction applied in the mold of Figures 10 to 12, applied to the making of a ball with four panels or gores. Here the mold assemblage comprises two outer portions 81 and 82 with shallow cavities 83 and 84, respectively, each having a peripheral contour shaped to outline a panel of a four paneled sphere. On each of the mold portions around the mold cavity, is provided the cutting edge 85 raised above the mold face. A plurality of vent grooves 86 extend from their communication with the cavity near the rim, across the cutting edge and along the face of the mold to a holding groove 105 in the face of the mold block surrounding the cavity. An internal channel 87 connects the holding groove with a connecting pipe 88 for connection with a suitable source of vacuum. A pair of intermediate mold members 89 and 90 in the form of flat plates are arranged to extend in between the outer mold members 81 and 82 when the parts are brought together as indicated in Figure 14, suitable dowels 91 set in the lower mold member 81 and arranged to engage guide holes 92 in the plates and 93 in the upper mold member being provided for guiding the parts into proper cooperative relation. The plates 89 and 90 extend inwardly to near the center of the assemblage where their adjacent edges 94 and 95 are spaced apart. The polar extremities 96 and 97 of the cutting edges on the lower mold member 81, are arranged to extend between the plates into cooperative relation with a similar, opposed portion on the upper mold member 82, in a manner to be later described, the portion 96 being extended around the rim of a semi-cylindrical polar extension 98 of the mold cavity. To permit presentation of the cutting edge portion 96 to a similar portion, not shown, on the upper mold member 82, clear of the plates 94–95, the plates are cut away at 99 and 100.

In the use of this mold assemblage, the several members being separated to facilitate application of the raw material thereto, thin sheets of raw rubber 100 and 101, are laid across the faces of the outer members 81 and 82, respectively, by application of a vacuum to the connecting pipes 88 which first acting through the holding grooves 105 operates to draw and hold the margin of the sheet down around the rim of the cavity and then to exhaust the cavity over the cutting edges through the venting grooves 86 to draw the sheet down into the cavity. With the raw material thus seated in the two outer mold members and the plates 89 and 90 covered on both faces and around over their edges 94 and 95 with thin sheets 102 and 103 of raw rubber, the parts are superimposed as indicated in Figure 14 with the adjacent edges 94 and 95 of the intermediate plates spaced apart sufficiently to insure separation of their rubber coverings 102 and 103 and permit the cutting edge portions 97 of the outer mold members to pass therebetween into cooperative relation with each other. From this position the parts are brought together under pressure to bring the cutting edges 85 bordering the sides of the cavities against the plates 89 and 90 and the polar cutting edge portions 96 and 97 of one outer member against the corresponding cutting edge portions of the other outer member, between the adjacent edges 94—95 of the plates whereby the surplus raw rubber stock is sheared off at the cutting edges and contacting portions of the rubber sheet joined at the inner sides of the cutting edges. With the article thus formed, the mold assemblage, held together by any known or other suitable clamping means, not shown, may be then heated to vulcanize the article. From an inspection of Figure 14, it will be seen that the pieces of sheet rubber 100 and 101 form one pair of opposite gores or panels while the pieces 102 and 103 form the other pair of opposite panels of the four paneled structure capable of being inflated into a general spherical form. Inasmuch as the four panels are made from four separate pieces of raw stock, they may be made of different colored stock, thus readily providing for various decorative color combinations and arrangements without necessity for a separate decorating step.

It will be clear that the apparatus and method just described above is applicable to the manufacture of various thin walled articles such as bathing caps, ice bags or thin walled hot-water bags.

In practice the thickness of rubber to be used as well as the type of rubber compound will determine the type of cutting edge or seam to be used. Different forms of cutting edges are shown in Figures 15 to 18 from which it will be clear that the contour of the cavity side 104 of the cutting edge portion of the mold determines the outer contour of the seam. Also the contour of the venting grooves may vary, two variants being shown in Figures 19 and 20.

While the various forms of mold members have been herein shown with a simple connecting pipe such as the pipe 29 of Figure 7, for the establishment of a connection of the mold venting system with a suitable source of vacuum or compressed air as required, it will be obvious than any known or other suitable form of valving mechanism may be used between the connecting pipe and such source or sources for convenient control of the connection. It will also be understood that the connecting pipe may be omitted and connection with the mold venting system established through an opening in the mold block arranged to communicate with a chamber or duct in a mold support for extension of the connection to a source of vacuum or compressed air.

While certain specific embodiments of the invention have been herein shown and described for the sake of disclosure, it is to be understood that the invention is not limited to such specific embodiments, but contemplates all such modifications thereof as fall fairly within the scope of the appended claims.

What is claimed is:

1. A combined forming and curing mold for molding hollow rubber articles comprising a mold member having a cavity surrounded by a cutting and seaming edge at its rim, a plurality of narrow open-trough venting channels extending as an open trough across the cutting edge into communication with the cavity at the rim and means exterior of the cavity and beyond the cutting edge and having communication with the outer ends of said venting channels for establishing suction in said channels, when a sheet of rubber is applied across the face of the mold to cover said cavity and said venting channels, for seating the rubber sheet against the walls of said cavity and said cutting edge, the surface of the mold member surrounding the cutting edge from the latter outwardly being cut away forming an offset to provide a relatively wide clearance allowing removal of the trimmings when two of such complemental mold members are pressed together.

2. A combined forming and curing mold for molding hollow rubber articles comprising a mold member having a cavity, a cutting and seaming edge surrounding the cavity, a vacuum holding groove surrounding the cutting edge, means for applying an air suction to said groove, and a plurality of venting grooves extending as an open trough from the cavity across the cutting edge to the holding groove, whereby, when a sheet of rubber is placed upon the face of the mold to overlie said cavity, said venting grooves and said holding groove, said rubber sheet will be seated against the walls of the cavity when suction is applied to said holding groove the surface of the mold member surrounding the cutting edge from the latter outwardly being cut away forming an offset to provide a relatively wide clearance allowing removal of the trimmings when two of such complemental mold members are pressed together.

3. A combined forming and curing mold for molding hollow rubber articles, comprising a mold member having a cavity surrounded by a cutting and seaming edge at its rim, and a plurality of narrow shallow open-trough venting grooves extending outwardly from the cavity across the cutting edge, and a complementary mold member similar to said first mentioned mold member having its cutting edge arranged to register with the cutting edge of the first mentioned mold member and its venting grooves staggered with relation to those of the first mentioned mold member, all of the opposing surfaces of said mold members from their cutting edges outwardly toward their perimeter being spaced apart to permit removal of trimmings or excess material after cutting and seaming.

4. A combined forming and curing mold for molding hollow rubber articles, comprising a mold member having a cavity surrounded by a cutting edge near the rim, and a plurality of narrow, shallow, open-trough venting grooves extending outwardly from the cavity across the cutting edge, and a complementary mold member similar to said first mentioned mold member having its cutting edge arranged to register with the cutting edge of the first mentioned mold member and its venting grooves staggered with relation to those of the first mentioned mold member, the cutting edge of each mold member having projections each arranged to fit into a venting groove in the other mold member.

5. Apparatus for molding hollow articles of plastic material, comprising a wall-forming mold member having a cavity with a re-entrant central portion, and a curing mold member having a cavity and having an outwardly projecting cutting and seaming edge extending around the rim of the cavity and arranged to register with a portion of the cavity of the wall-forming mold member lying between the re-entrant portion and the rim of the forming mold member, whereby the portion of plastic material extending between the rim and the re-entrant portion of the cavity of the forming mold member will overlie the cutting edge of the curing mold member when transferred thereto, said curing mold member having a plurality of open-trough venting channels extending across the cutting edge into communication with the cavity of the curing mold member at the rim.

6. Apparatus for molding hollow articles of plastic material comprising, a preforming mold member having a cavity with rim and a re-entrant portion spaced inwardly of the margin of the cavity, a curing mold member having a cavity and a cutting and seaming rim defining the seam joining two portions of the finished article, said seam-defining rim registering with a portion of the cavity of the preforming mold member lying between the re-entrant portion and the rim of the preforming mold member whereby the portion of plastic material formed in the cavity of the preforming mold member and lying between said re-entrant portion and said rim of the cavity of the preforming mold member will overlie the seam-defining rim of the curing-mold member when transferred to the curing-mold member.

7. Apparatus for molding hollow articles of plastic material comprising, a preforming mold member having a cavity with rim and a re-entrant portion spaced inwardly of the margin of the cavity, a cooperating article-forming-and-cutting mold member having a cavity of the shape of a portion of the finished article and having a rim defining the seam joining said portion with another portion of said article, a cutting edge extending along the seam-defining rim and registering with a portion of the cavity of the preforming mold member lying between the re-entrant portion and the rim of the cavity of the preforming mold member, whereby the portion of plastic material formed in the cavity of the preforming mold member and lying between the reentrant portion and the rim of the cavity of the preforming mold member will overlie the seam-defining rim and cutting edge of the article-cutting-and-forming mold member when transferred to the latter mold member.

8. Apparatus for making hollow articles of plastic material comprising a wall-forming mold member having a cavity for forming a part of the wall of the article and a pneumatic holding groove surrounding the cavity for holding a marginal portion of a piece of sheet plastic seated in the cavity, a corresponding curing mold portion having a cavity of the shape of a corresponding portion of the finished article and a pneumatic holding groove in the face of the mold portion surrounding the cavity, said curing-mold portion being arranged to be presented to the wall forming mold portion with their cavities in register and with the formed article part interposed and extending across the cavity of the curing mold portion and its marginal portion extending across the holding groove of the curing mold portion whereby the article portion may be transferred from the wall-forming mold portion to the corresponding curing mold portion during engagement of the said marginal portion with the holding groove in the curing mold portion.

9. Apparatus for making hollow articles of plastic material comprising a wall-forming mold member having a cavity for forming a part of the wall of the article and a pneumatic holding groove surrounding the cavity for holding a marginal portion of a piece of sheet plastic seated in the cavity, a corresponding curing mold portion having a cavity of the shape of a corresponding portion of the finished article and a pneumatic holding groove in the face of the mold portion surrounding the cavity, said curing mold portion being arranged to be presented to the wall forming mold portion with their cavities in register and with the formed article part interposed and extending across the cavity of the curing mold portion, said holding grooves in the different mold portions being offset radially of each other so that they will lie one within the other when the mold portions are presented to each other with their cavities in register.

10. A combined forming and curing mold for making thin walled rubber articles comprising a pair of complementary mold parts having opposed cavities of the shape of opposite sides of the article, surrounded by an elevated cutting edge at the margin of the cavity and provided with a plurality of open trough venting channels extending across the cutting edge into communication with the cavity at the rim, and an intermediate member arranged to be interposed between a portion only of the said complementary mold parts across a portion only of said opposed cavities and their cutting edges, said cutting edges being elevated in different amount at different portions so as to contact with the intermediate member when overlapped thereby and to extend beyond the intermediate member into engagement with each other when not overlapped by the intermediate member.

11. A combined forming and curing mold for making thin walled rubber articles comprising a pair of complementary mold parts having opposed cavities of the shape of opposite sides of the article, surrounded by an elevated cutting edge at the margin of the cavity and provided with a plurality of open trough venting channels extending across the cutting edge into communication with the cavity at the rim, certain opposed portions of said opposed cavities representing a pair of laterally spaced projecting members of the object to be formed, and an intermediate plate member arranged to be interposed between said certain opposed portions of the cavities and their cutting edges, said cutting edges being elevated in different amount at different portions so as to contact with the intermediate plate member where overlapped thereby and to extend beyond the intermediate plate member where not overlapped thereby.

12. A combined forming and curing mold for making a thin walled rubber article comprising a pair of complementary mold parts having cavities of the shape of opposite sides of the article surrounded by an elevated cutting edge at the margin of the cavity and provided with a plurality of venting grooves extending across the cutting edge into communication with the cavity at the rim, and a pair of intermediate plate members arranged to be interposed in a common plane between said complementary mold parts with the adjacent edges of the said plate members spaced apart, said complementary mold parts being arranged with portions of their cutting edges elevated to extend through the space between the adjacent edges of the plate members into engagement with each other.

13. The process of making a hollow rubber article which comprises seating rubber stock for different portions of the article in the cavities of different forming-mold portions, pneumatically transferring the seated article-portions each separately from its forming-mold portion to the cavity of a different curing-mold section, and thereafter bringing the different curing-mold sections together to form a seam between different portions of the article.

14. The method of making hollow articles of plastic material which comprises pneumatically seating a piece of sheet plastic material in the cavity and across the rim of the cavity of a portion of a forming mold to form a portion of a hollow article, presenting to the forming mold portion a curing mold portion having a rimmed cavity of the shape of the portion of the finished article corresponding to the article portion formed in the forming mold with the formed article portion positioned between the two mold portions, pneumatically transferring the article portion from the forming mold portion to the curing mold portion by admitting air to the cavity of the forming mold and venting air from the cavity of the curing mold over the rim edges of the respective mold cavities, closing said curing mold part upon a complementary curing mold part to which another article part has been transferred to bring the two article parts together, and curing the article in the curing mold.

15. The method of forming thin walled rubber articles which comprises pneumatically seating a piece of thin sheet raw rubber in the cavity of each of a pair of complementary curing mold portions having raised marginal cutting edges around their cavities by venting the cavity, through an open trough venting channel across the marginal cutting edge, between the mold and the sheet rubber, wrapping a piece of thin sheet raw rubber about an intermediate plate mold member, bringing the complementary mold members together with the covered intermediate plate member intermediate a portion only of the complementary mold members to separate a portion of the opposed sheets of rubber seated in the cavities of the complementary mold portions by the rubber wrapped around the intermediate plate member, clamping the mold members together as thus assembled to shear off the rubber between the opposed cutting edges and between the cutting edges and the intermediate plate member, and heating the assembled mold to cure the rubber article.

16. The process of making a hollow rubber article, which comprises seating a portion of a sheet of rubber in a cavity by pneumatic pressure on one side of the sheet, reversing the pneumatic pressure to the other side of the sheet and forcing the seating portion of the sheet into a coacting cavity of different size and shape and vulcanizing the seated rubber while forced against the wall of the mold by a preponderance of pneumatic pressure.

17. The process of making a hollow rubber article which comprises pneumatically seating rubber stock for different portions of the article in the cavities of different forming mold portions, pneumatically transferring the formed article portions from the forming mold cavities to the cavities of a co-acting curing mold section, and thereafter bringing two curing mold sections together to form a seam between different portions of the article, and vulcanizing the article without removing it from the curing mold.

18. The method of making hollow rubber articles which comprises pneumatically seating a piece of raw rubber stock in a mold cavity and over a cutting edge at the rim of the cavity of the mold while venting the cavity over the cutting edge only through a plurality of capillary grooves each having an over-the-rim cross sectional area not greater than one-half of a square centimeter, applying a second piece of raw rubber stock over the first mentioned sheet and the rim of the mold to complete formation of a closed hollow article, pressing the two pieces of rubber stock together at the rim over which venting has taken place, and vulcanizing the parts while so held.

JEAN E. L. RYAN.